US Patent [19]
Enstrom

[11] Patent Number: 4,825,130
[45] Date of Patent: Apr. 25, 1989

[54] DISPATCH BOARD SYSTEM
[75] Inventor: Paul M. Enstrom, Fremont, Calif.
[73] Assignee: Centigram Corporation, San Jose, Calif.
[21] Appl. No.: 38,153
[22] Filed: Apr. 14, 1987
[51] Int. Cl.[4] .............................................. G09F 9/33
[52] U.S. Cl. ................... 315/317; 315/314; 340/803; 340/804; 379/84; 379/214
[58] Field of Search ............... 379/76, 164, 214, 215, 379/376, 396, 84; 340/700, 803, 804; 315/294, 295, 312, 314, 315, 317

[56] References Cited
U.S. PATENT DOCUMENTS

| | | | |
|---|---|---|---|
| 4,060,975 | 12/1977 | Yamaguchi | 340/803 |
| 4,074,256 | 2/1978 | Sekiya et al. | 340/803 |
| 4,194,089 | 3/1980 | Hashimoto | 379/73 |
| 4,470,092 | 9/1984 | Lombardi | 364/483 |

Primary Examiner—Alan Faber
Assistant Examiner—James E. Tomassini
Attorney, Agent, or Firm—Thomas E. Schatzel

[57] ABSTRACT

An electronic dispatch board for use with a voice message recording-playback machine. The dispatch board lights certain lamps responsive to signals sent from the message recording-playback machine when a message has been placed in a certain voice mailbox. The dispatch board is comprised of a serial-to-parallel converter, a board address comparator, an address signal verifier, a lamp driver, and a plurality of lamps. The address signal verifier determines if a valid address signal has been received from the message recording machine. A number of dispatch boards may be simultaneously connected to the same message recording machine. The board address comparator in each dispatch board determines if the address signal from the message recording machine is meant for that particular dispatch board. If a valid address signal has been received, a certain lamp is set to an on, off or blink state.

3 Claims, 5 Drawing Sheets

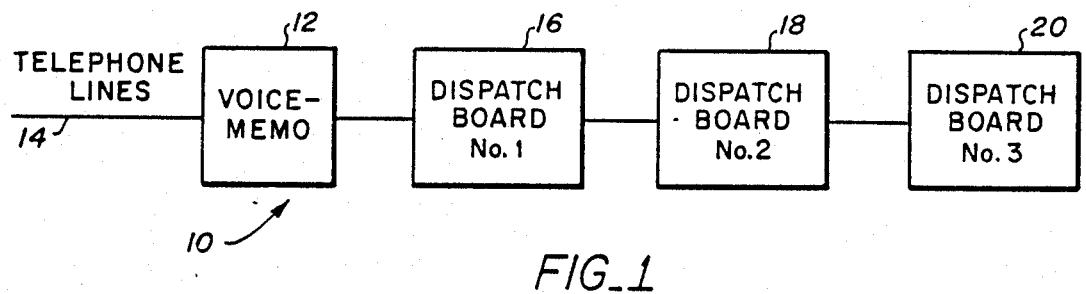

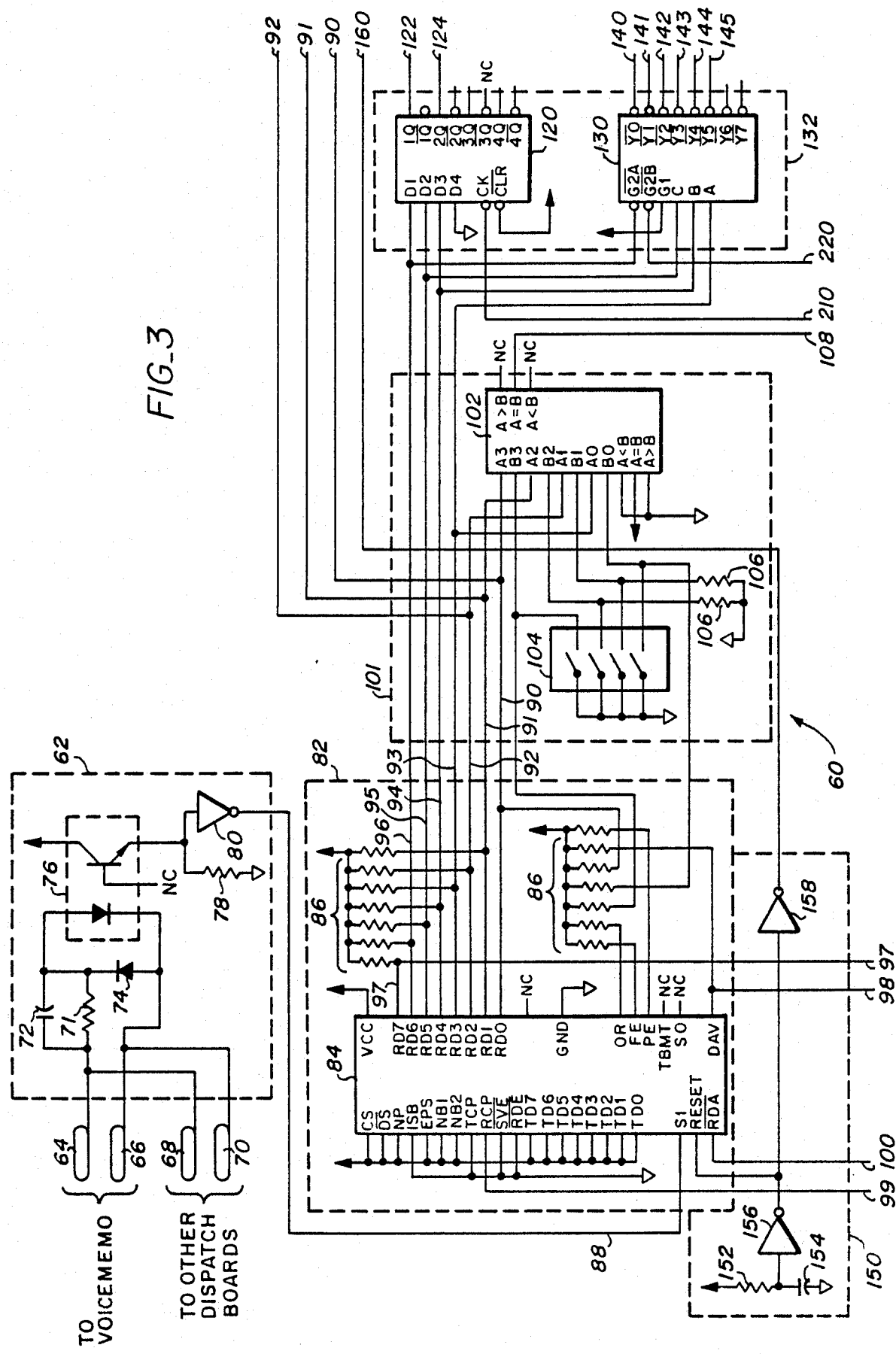
FIG_3

DISPATCH BOARD SYSTEM

BACKGROUND OF THE INVENTION

1. Field of the Invention

This invention relates generally to dispatch systems and more specifically to electronic dispatch boards for use with message recording machines.

2. Description of the Prior Art

Many businesses, such as telephone companies, have a large number of field service personnel. These service people typically install new equipment at a customer's facility or repair old equipment. In order to maintain the good will of the customers, it is critical that these service people respond as quickly as possible to a customer's request for service.

Field service personnel are usually assigned to a local service center. The service center personnel act as dispatchers to assign particular jobs to the field service people. The dispatchers keep track of the new installation jobs and also answer telephone calls from customers requesting repairs to equipment. The field service people contact the service centers for instruction and are assigned a job. Once a job assignment is completed, the field service person then contacts the center by telephone or personally to report a job completed and to receive a new job assignment.

This type of dispatch system can quickly become overwhelmed. For example, during peak contact times early morning and just before and after lunch), the field service people contact the dispatcher for their new assignments. If there are only twenty dispatchers for one hundred and fifty field service people, then it is clear that the dispatchers will not be able to keep up with all of the contacts from the field service people. The field service people are delayed for long periods of time or, if they are telephoning the dispatcher for assignments, they reach only busy signals. Due to the high labor pay rate of field service people, this wasted time can add up to much money and inefficiency.

During peak periods, the dispatch system can also strain customer relations. Customers calling the service center receive busy signals or are put on hold. Once a customer makes contact with a dispatcher to report a problem, it takes additional time for the dispatcher to get the assignment to a field service person. Another problem is that once a field service person finishes a job, he or she typically calls the service center from the customer's telephone to report a job completion and request a new assignment. The customer has to wait while the field service person trys to get a dispatcher to take down the job completion information and assign the next job.

SUMMARY OF THE PRESENT INVENTION

It is therefore an object of the present invention to provide a dispatch board which increases the efficiency of the dispatchers and the field service people.

It is another object of the present invention to provide a dispatch board which allows the dispatcher to record job assignments for future pick-up by the field service people.

It is another object of the present invention to provide a dispatch board which allows the field service people to record job completion information for future processing by the dispatcher.

In an exemplary embodiment, the present invention comprises a dispatch board for use with a voice memo record-playback machine, e.g. such as those marketed by Centigram Corporation. The voice memo machine has numerous voice mailboxes, each assigned a certain number, where voice messages can be recorded for playback to persons having access to the voice mailbox. Each field service person, is assigned two voice mailboxes, one for job assignments and one for job completion information.

The dispatch board has a nameplate for each field service person and two colored lights of different colors, e.g. one yellow and one green, beside each nameplate. When a dispatcher places a job assignment into a field service person's voice mailbox, a green light goes on. When the field service person calls his mailbox and receives the information from that particular mailbox, his green light goes off and the dispatcher knows that another assignment can be loaded into that particular field service person's mailbox. When the field service person completes an assignment, he calls in and leaves the job completion information in another mailbox and a yellow light goes on beside his nameplate. The dispatcher knows that the job completion information in that voice mailbox can be processed when time permits. Once the job completion information is taken out of the mailbox, the yellow light goes off beside that field service person's nameplate.

It is an advantage of the present invention in that it provides a dispatch board which increases the efficiency of both the dispatcher and the field service people.

It is another advantage of the present invention in that it provides a dispatch board which allows the dispatcher to record job assignments for future pick-up by field service people.

It is another advantage of the present invention in that it provides a dispatch board which allows the field service people to record job completion information for future processing by the dispatcher.

These and other objects and advantages of the present invention will no doubt become obvious to those of ordinary skill in the art after having read the following detailed description of the preferred embodiment which is illustrated in the various drawing figures.

IN THE DRAWING

FIG. 1 is a block diagram of the dispatch boards and a voice memo recorder-playback machine;

FIG. 2 is a front view of a dispatch board;

FIG. 3 is a circuit diagram of a portion of the dispatch board;

DETAILED DESCRIPTION OF THE PREFERRED EMBODIMENT

Figure 4:
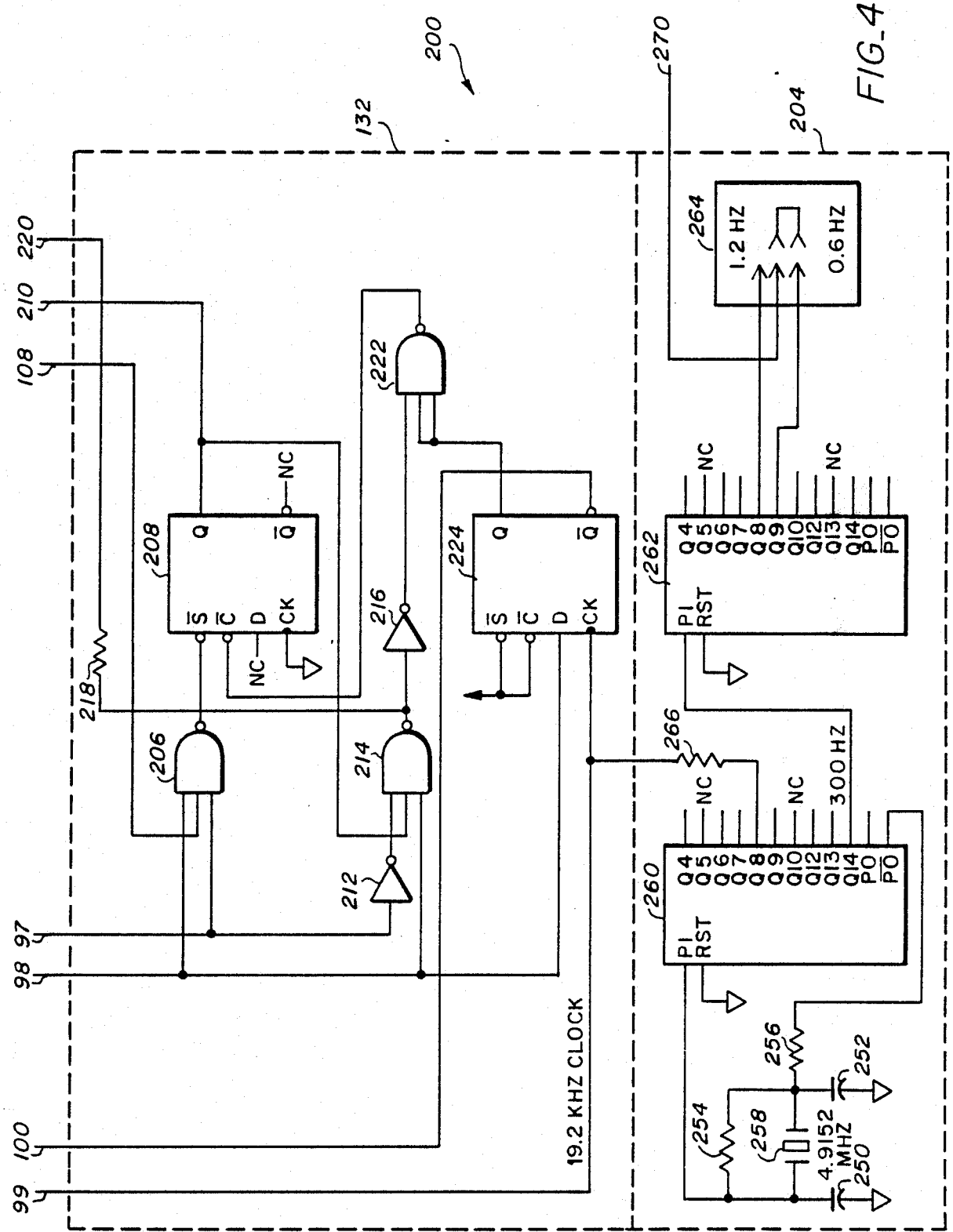
FIG. 4 is a circuit diagram of a portion of the dispatch board.

FIG. 1 shows a block diagram of a configuration of one embodiment of the present invention and is designated by the general reference number 10. A voice messaging record-playback machine 12 is connected to outside telephone lines 14. The machine 12 is a computerized voice messaging system which may be of the form manufactured and marketed by Centigram Corporation. The machine 12 allows users to record, send and retrieve messages in individually assigned voice mailboxes. Machine 12 contains commercially available software, e.g. Centigram software numbered 2600-0369-00 through 2600-0381-00, revisions 3.0 or later, can be used in operation with the dispatch board of the present invention.

A first dispatch board 16 is connected to machine 12. A second dispatch board 18 is connected to dispatch board 16 and a third dispatch board 20 is connected to board 18. In the preferred embodiment, the system 10 may be operated with one to sixteen dispatch boards. However, system 10 could be adapted to handle a greater number of boards.

FIG. 2 shows a front view of a dispatch board and is designated by the general reference number 50. Board 50 has a number of nameplates 52 mounted on the front. Each nameplate 52 contains the name of a different field service person. The preferred embodiment can accommodate up to twenty-four different names per dispatch board, but the system can be modified to handle a greater number of names per board. Located next to each nameplate 52 is a green light 54 and a yellow light 56.

FIG. 3 shows a circuit diagram of a portion of the dispatch board 50 and is designated by the general reference number 60. Circuit 60 comprises an optically isolated data receiver 62. The receiver 62 contains a point 64 and a point 66 for connection to the machine 12. A point 68 and a point 70 provide connection to additional dispatch boards if desired.

The receiver 62 comprises a resistor 71 connected to point 64. A capacitor 72 is connected in parallel with resistor 71. A diode 74 is connected between point 66 and resistor 71. An optical isolator 76 is connected in parallel with the diode 74. A resistor 78 is connected between the output of isolator 76 and ground. A NOT gate 80 is also connected to the output of isolator 76.

The NOT gate 80 is connected to a serial-to-parallel data receiver/transmitter circuit 82. The circuit 82 is comprised of a UART 84 and a plurality of pull-up resistors 86. The UART 84 functions to convert serial data to parallel data. Ten bits of serial data enters the UART 84 at a line 88. Eight of the ten bits is output along one of lines 90-97. The two remaining bits are used to control the UART 84. The UART 84 has an additional output line 98 and input lines 99 and 100.

The circuit 82 is connected to a board address comparator circuit 101. The board address comparator 101 is comprised of an arithmetic comparator 102 which is connected to lines 90-93. A four position DIP switch 104 is connected to comparator 102. A pair of resistors 106 are connected to the DIP switch 104 The comparator 102 has an output line 108.

A storage register 120 and a decoder 13 comprise a portion of an address signal verifier circuit 132. The storage register 120 is connected to lines 94-96. Storage register 120 has two output lines 122 and 124. The decoder 130 is connected to lines 93-96. Decoder 130 has output lines 140-145.

A power-up reset circuit 150 is comprised of a resistor 152, a capacitor 154, a NOT gate 156 and a NOT gate 158. The reset circuit 150 is connected to the UART 84 to reset the UART on power-up. The reset circuit 150 also has an output line 160 which is used to reset the circuits shown in FIG. 5.

FIG. 4 shows a circuit diagram of another portion of the dispatch board 50 and is designated by the general reference number 200. Circuit 200 comprises another portion of the address signal verifier circuit 132 and a clocking circuit 204. Verifier 132 comprises a NAND gate 206 which is connected to lines 98, 97 and 108 from FIG. 1. The output of NAND gate 206 is connected to a latch 208. Latch 208 has an output line 210. A NOT gate 212 is connected to line 97. A NAND gate 214 is connected to NOT gate 212, line 210, and line 98. The output of NAND gate 214 is connected to a NOT gate 216 and a resistor 218. A line 220 is connected to resistor 218. A NAND gate 222 is connected to NOT gate 216 and a latch 224. The output of NAND gate 222 is connected to the clear input of latch 208. The inputs of latch 224 are connected to lines 98 and 99.

The clocking circuit 204 is comprised of a capacitor 250, a capacitor 252, a resistor 254, a resistor 256, a crystal diode 258, a binary divider 260, a binary divider 262, a switch 264 and a resistor 266. Binary divider 260 puts out a 19.2 KHz clocking signal through resistors 266 to line 99. The signal clocks the UART 84 and latch 224. The binary divider 262 puts out both a 1.2 Hz and a 0.6 Hz clocking signal to switch 264. Switch 264 is used to select the appropriate clock signal and outputs it on a line 270.

Figure 5:
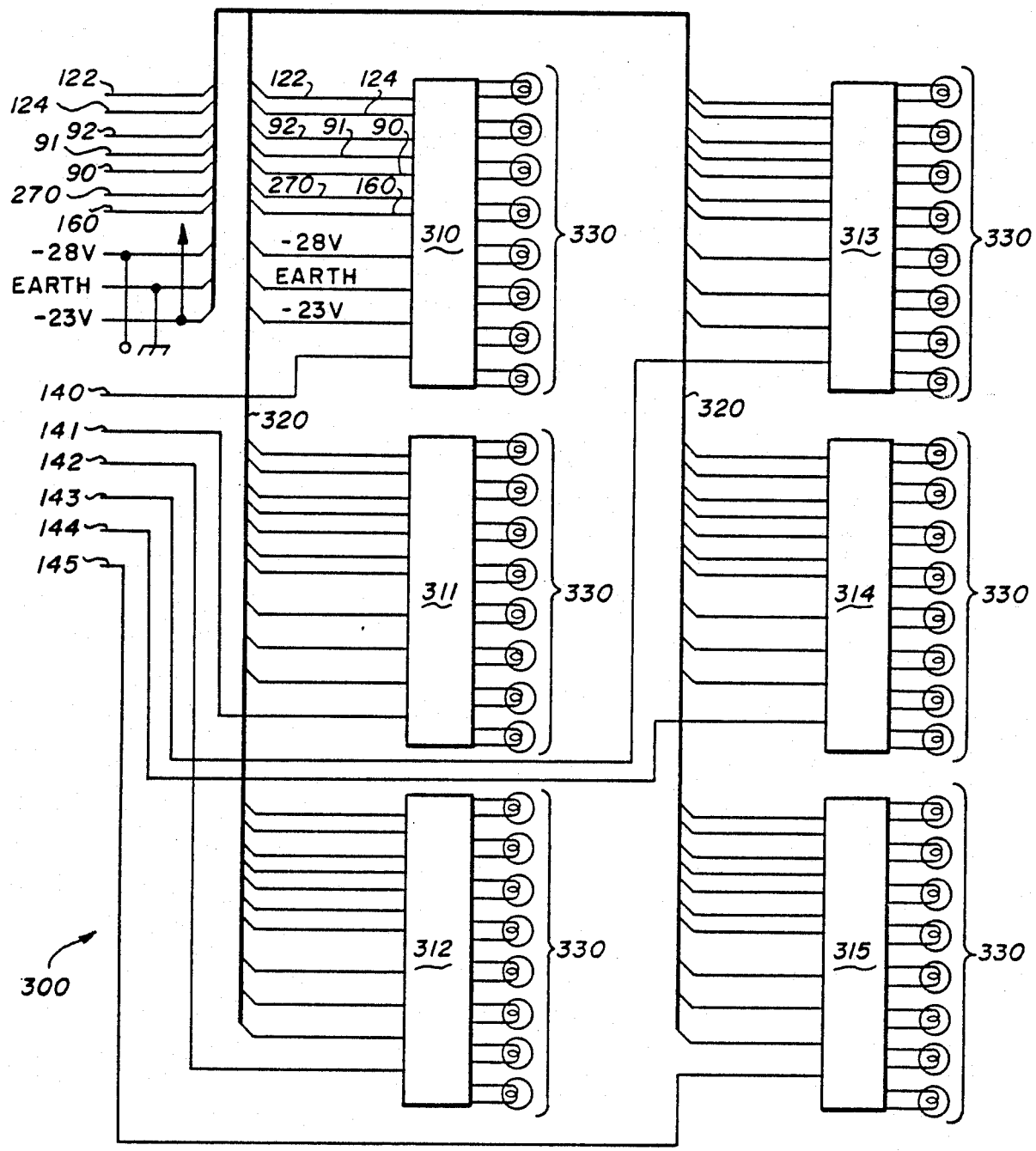
FIG. 5 is a circuit diagram of a portion of the dispatch board.

FIG. 5 shows a circuit diagram of a further portion of dispatch board 50 and is designated by the general reference number 300. Circuit 300 comprises a number of lamp drivers 310-315. Each driver 310-315 is connected to a bus 320 which carry lines 122, 124, 92, 91, 90, 270 and 160 to each of drivers 310-315. Lines 140-145 are connected to drivers 310-315 respectively. Circuit 300 has a number of lamps 330. In the preferred embodiments, there are eight lamps 330 connected to each of drivers 310-315.

Figure 6:
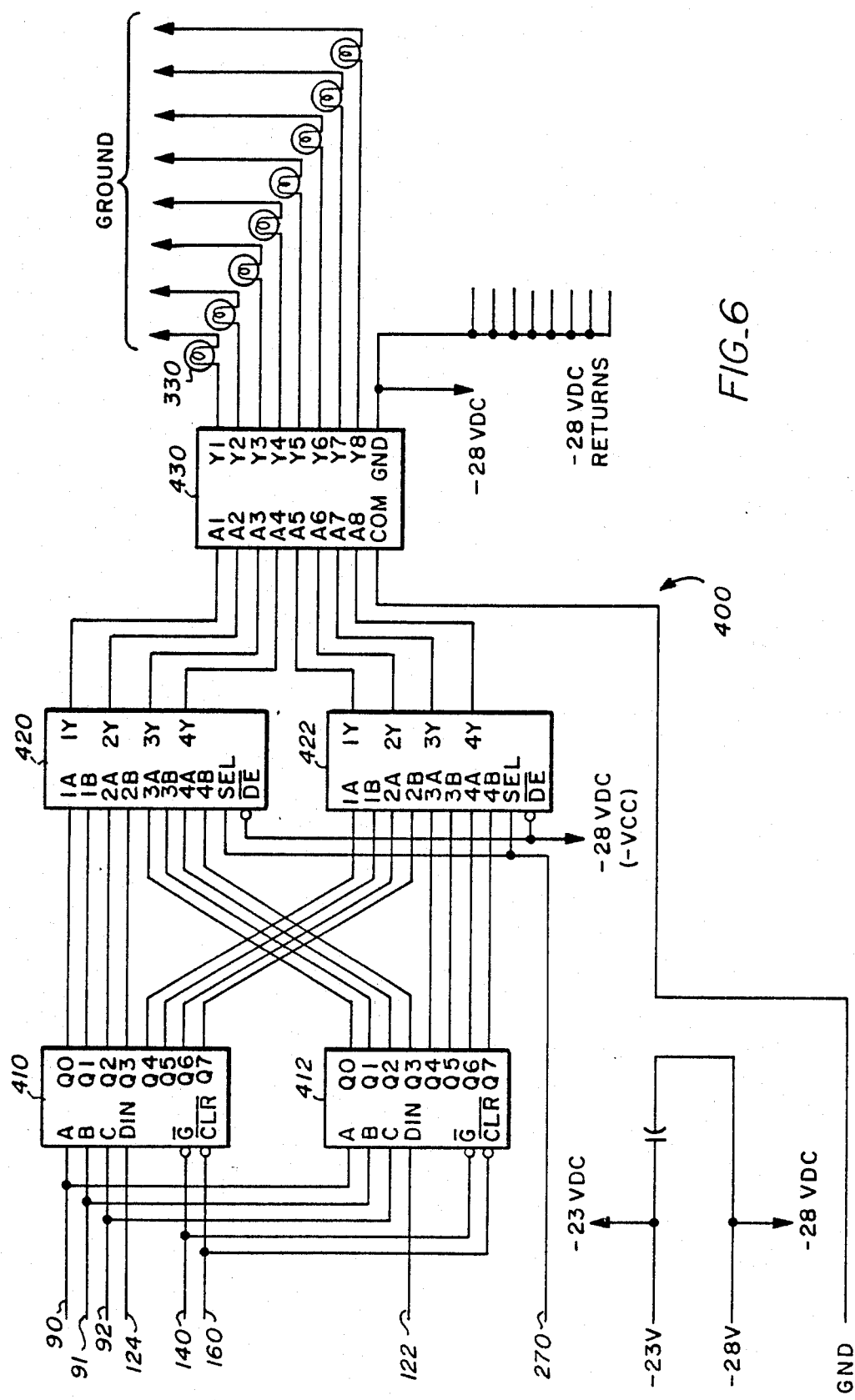
FIG. 6 is a circuit diagram of the lamp driver circuit of FIG. 5.

FIG. 6 shows a circuit diagram of the driver 310 and is designated by the general reference number 400. Each of drivers 310-315 are identical, except for the connection to lines 140-145. Circuit 400 is comprised of a pair of addressable eight-bit registers 410 and 412. Register 410 is connected to lines 90-92, 124, 140 and 160. Register 412 is connected to lines 90-92, 122, 140 and 160.

A pair of quad, two input, data selectors 420 and 422 are connected to registers 410 and 412 and line 270. An eight channel amplifier 430 is connected to selectors 420 and 422. The amplifier 430 converts current from one milliamp to forty milliamps. The amplifier 430 is connected to eight lamps 330.

In operation, the present invention is configured according to FIGS. 1 and 2. The number of boards 50 needed will depend upon the number of field service people assigned to the particular service center. Up to twenty-four field service people can be accomodated with a single board 50. The machine 12 is programmed such that there are two voice mailboxes, a job assignment and a job completion mailbox, assigned to each field service person. Each voice mailbox can hold recorded messages and each is designated by its own three digit number.

At the start of the service center operation, e.g. the beginning of the day, the dispatcher loads the job assignments into the machine 12. This is done via telephone lines 14. By pressing the appropriate sequence of dual tone multi-frequency (DTMF) buttons on the telephone, the dispatcher can access the job assignment mailbox of a particular field service person, such as B. Prentice, shown in FIG. 2. When the job assignment is loaded into the particular mailbox, the software within the machine 12 sends a two byte address signal to the dispatch board 50. This address signal causes the board 50 to light the green light 54 beside the name B. Prentice. The dispatcher can tell by the on or off indication by the green lights 54 how many field service people are available for assignments.

The field service person, B. Prentice, by telephone, can call into the machine 12 from any field location to access the appropriate assignment mailbox and retrieve a further job assignment. After the assignment is received, the field service person presses a certain code and deletes the information from that mailbox and the green light beside the nameplate goes out. This indicates to the dispatcher that another job assignment can be loaded into that mailbox.

Another field service person, such as R. Albert as shown in FIG. 2, can call into the machine 12 from out in the field and access his job completion mailbox. He records the job completion information into the mailbox. The machine 12 then sends an address signal to board 50 to light the yellow light 56 next to his nameplate. This indicates to the dispatcher that the completion information is available in R. Albert's job completion mailbox and the dispatcher can take it out for processing at a convenient time. When the dispatcher finishes retrieving the information from the mailbox, the dispatcher presses a code to delete the information from the mailbox and the yellow light 56 associated with that box goes out.

Turning now to FIG. 3, the dispatch board 50 receives the first byte of the address signal via points 64 and 66. The first byte of the address signal passes through receiver 62 to the UART 84. If a valid eight-bit byte is received, the UART will output a "1" on line 98. The UART then breaks the serial eight-bit signal into a parallel signal on lines 90-97. Each bit of the byte represents a certain condition. The first bit is output on line 97 and indicates whether this is the first or second byte of the two byte address signal. A "1" on line 97 indicates a first byte and a "0" indicates the second byte. The next three bits are output on lines 94-96 and indicate the light status (on, off, or blinking). The final four bits are output on lines 90-93 and indicate which particular dispatch board is to be used; i.e., no. 1, no. 2, etc.

The four position dip switch 104 can be set for up to sixteen different settings, each one corresponding to a different board. The arithmetic comparator 102 checks the signal on lines 90-93 against the dip switch 104 setting. If they match, then the address signal is intended for that particular board, and a "1" is output on line 108.

Turning now to FIG. 4, if the signal is intended for this particular board, if the byte is valid, and if it is the first byte, then NAND gate 206 enables latch 208. Latch 208 then clocks register 120 via line 210 and the bits 94-96 (which indicate the lamp status) are stored in the register 120.

When the second byte of the address signal reaches the UART 84, its bits are separated on lines 90-97. A "0" output on line 97 indicates that this is the second byte. The bits on line 93-96 indicate which of the drivers 310-315 are to be used. The bits on lines 90-92 indicate what particular lamp 330 of the particular driver is to be used. If a valid second byte has been received and latch 208 has been enabled, then NAND gate 214 sends a signal to line 220 to enable decoder 130. Decoder 130 then sends out a single signal on one of lines 140-145 depending on which of drivers 310-315 will be used.

Looking now at FIG. 5, one of drivers 310-315 is enabled when it receives a signal via one of lines 140-145. The enabled driver then receives information depending on which of the eight lights is being addressed (lines 90-92) and whether to turn the light on, off, or have it blink (lines 122 and 124). Line 270 provides the timing signal for a blinking light.

The blinking light feature is an option which may be used to remind the dispatcher that a very important job has been placed in a certain mailbox. The flashing light would allow the dispatcher to monitor the mailbox and if that particular field service person is still busy after a period of time, the dispatcher could reassign that particular job to another field service person.

The dispatch board of the present invention has been shown operating with a voice messaging machine produced by Centigram Corporation. However, other computerized voice messaging machines could be used with the dispatch board. The software would have to be modified in order to send the proper address signals to the dispatch board. The dispatch board could also be used as a peripheral to a computer system.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A dispatch board system comprising:
   a decoder for receiving an address signal;
   an address signal verifier connected to the decoder for determining if a valid address signal has been received, the address signal verifier being comprised of a first NAND gate connected to the decoder, a first latch connected to said first NAND gate, a first NOT gate connected to the decoder, a second NAND gate connected to said first NOT gate, said first latch, and the decoder, a second NOT gate connected to said second NAND gate, a second latch connected to the decoder, a third NAND gate connected to said second NOT gate, said second latch and said first latch, and a storage register connected to the decoder and said first latch;
   a lamp driver connected to the decoder and said storage register of the address signal verifier, for driving a plurality of lamps responsive to said address signal; and
   a plurality of lamps connected to the lamp driver.

2. A dispatch board system comprising:
   a decoder for receiving an address signal;
   a board address comparator connected to the decoder for determining if said address signal is addressing this particular dispatch board;
   an address signal verifier connected to the decoder and the board address comparator for determining if a valid address signal has been received, the address signal verifier being comprised of a first NAND gate connected to the decoder and the board address comparator, a first latch connected to said first NAND gate, a first NOT gate connected to the decoder, a second NAND gate connected to said first NOT gate, said first latch and the decoder, a second NOT gate connected to said second NAND gate, a second latch connected to the decoder, a third NAND gate connected to said second NOT gate, said second latch and said first latch, and a storage register connected to the decoder and said first latch;
a lamp driver connected to the decoder and said storage register of the address signal verifier, for driving a plurality of lamps responsive to said address signal; and
a plurality of lamps connected to the lamp driver.

3. A dispatch board system comprising:
a decoder for receiving an address signal;
a board address comparator connected to the decoder for determining if said address signal is addressing this particular dispatch board;
an address signal verifier connected to the decoder and the board address comparator for determining if a valid address signal has been received, the address signal verifier is comprised of a first NAND gate connected to the decoder and the board address comparator, a first latch connected to said first NAND gate, a first NOT gate connected to the decoder, a second NAND gate connected to said first NOT gate, said first latch and the decoder, a first resistor connected to said second NAND gate, a second NOT gate connected to said second NAND gate, a second latch connected to the decoder, a third NAND gate connected to said second NOT gate, said second latch and said first latch, a storage register connected to the decoder and said first latch, and a driver decoder connected to the decoder and said first resistor;
a plurality of lamp drivers connected to the decoder, said driver decoder and said storage register of the address signal verifier, for driving a plurality of lamps responsive to said address signal; and
a plurality of lamps connected to the lamp drivers.

* * * * *